United States Patent [19]

Child et al.

[11] Patent Number: 5,121,475
[45] Date of Patent: Jun. 9, 1992

[54] METHODS OF DYNAMICALLY GENERATING USER MESSAGES UTILIZING ERROR LOG DATA WITH A COMPUTER SYSTEM

[75] Inventors: Garry L. Child, Austin; Richard J. Hrabik, Leander; Beverley J. Michalk; Curtis J. Rousse, both of Austin, all of Tex.

[73] Assignee: International Business Machines Inc., Armonk, N.Y.

[21] Appl. No.: 492,386

[22] Filed: Mar. 9, 1990

Related U.S. Application Data

[63] Continuation of Ser. No. 179,180, Apr. 8, 1988, abandoned.

[51] Int. Cl.$^5$ .............................................. G06F 3/14
[52] U.S. Cl. .................................. 395/153; 395/161; 371/17
[58] Field of Search .................. 371/16.5, 17, 19; 395/153, 161

[56] References Cited

U.S. PATENT DOCUMENTS

| | | | |
|---|---|---|---|
| 3,704,363 | 11/1972 | Salmassu et al. | 371/29 X |
| 3,778,767 | 12/1973 | Carlyle et al. | 371/29.1 |
| 4,062,061 | 12/1977 | Batchelor et al. | 371/29 X |
| 4,063,311 | 12/1977 | Jeremiah et al. | 371/29 X |
| 4,108,360 | 8/1978 | Beismann et al. | 371/16.5 |
| 4,135,662 | 1/1979 | Dlugos | 364/900 |
| 4,423,508 | 12/1983 | Shiozaki et al. | 371/29 X |
| 4,550,278 | 10/1985 | Yamanaka | 371/27 |
| 4,554,661 | 11/1985 | Bannister | 371/29 X |
| 4,593,391 | 6/1986 | Mizushima et al. | 371/29 X |
| 4,625,312 | 11/1986 | Bashaw | 371/29 X |
| 4,658,351 | 4/1987 | Teng | 364/200 |
| 4,661,923 | 4/1987 | Venkatesh et al. | 371/29 X |
| 4,679,195 | 7/1987 | Dewey | 371/29 |

FOREIGN PATENT DOCUMENTS 0295379 4/1988 European Pat. Off.

OTHER PUBLICATIONS

"The Multifunction Operations System", C. G. Golder et al, pp. 149–169, Philips Telecommunication Review, vol. 42, No. 3, Sep. 1984.

"Design of Terminal Supervisor in Transmission Facility", K. Aihara et al, pp. 581–596, *Review of the Electrical Communication Laboratories*, vol. 29, Nos. 5–6, May–Jun. 1981.

*Primary Examiner*—David L. Clark
*Attorney, Agent, or Firm*—Casimer K. Salys; H. St. Julian

[57] ABSTRACT

An error log request is generated by a component of a communication software system. The error log request is analyzed and compared to entries in one of a plurality of records in a message look-up table. If there is a match between the fields of the error log request and selected entries of a record in the look-up table, a user message request is generated which facilitates the display of a pre-existing user friendly message as modified with data included in the generated user message request.

9 Claims, 3 Drawing Sheets

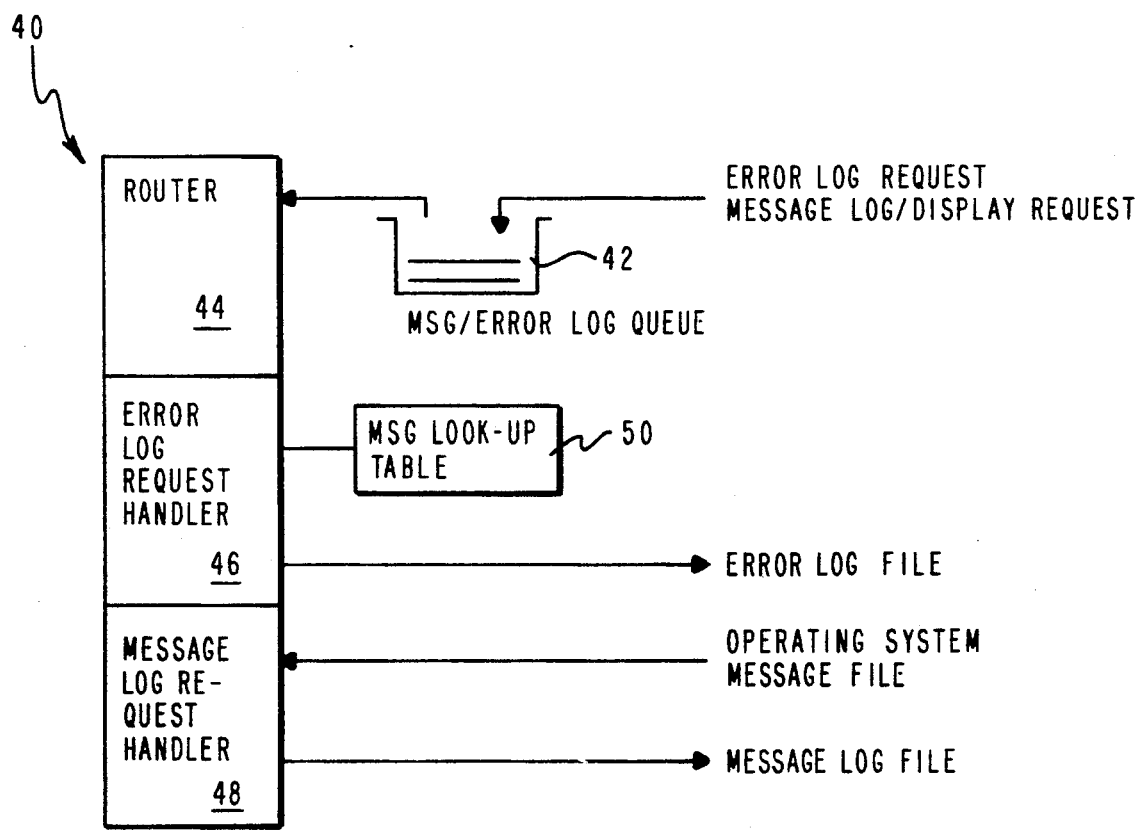

METHODS OF DYNAMICALLY GENERATING USER MESSAGES UTILIZING ERROR LOG DATA WITH A COMPUTER SYSTEM

This is a continuation of application Ser. No. 07/179,180 filed Apr. 8, 1988 now abandoned.

DESCRIPTION

1. Technical Field

This invention relates generally to displaying messages, and more particularly to methods of automatically displaying messages based on error log information in a computer system in an accurate and user friendly manner.

2. Background Information

It is well known in the art that in communication software systems, a component may log errors for later analysis. During the execution of one of a plurality of communication services or functions, a problem may occur which will cause an associated error to be logged to the error log for later analysis. Typically, the error information is in a language which is not readily understood by the average user of the communication software system. Moreover, the component performing the service or function is only concerned with logging the error information. Thus, the user in prior systems may not know that an error has been logged which may prevent a function from being executed or a service performed. This becomes more of a problem in a multitasking environment. In this environment, the user may initiate one task and then change to a different screen to initiate a different task. While the user is operating on the different screen, the first task may encounter problems which prevents the task from executing. For purposes of illustration, the use may initiate the transfer of a large file and then switch to a personal editor function on the system while the file is being transferred. If a problem occurs which prevents the file from transferring, the user may never know of the error unless the progress of the transfer is frequently monitored. As noted above, even if the user is aware of an error, the information stored in the error log may be very cryptic and not easily understood.

Consequently, there is a need to inform the user in a user friendly manner of the logging of selected errors and to present the user with a higher level of detail of the error condition without affecting the performance of the computer system.

DISCLOSURE OF THE INVENTION

This invention relates to methods of displaying user friendly messages in response to an error log request. An error log request which has been generated by a component of a communication software system is analyzed and compared to entries in one of a plurality of records in a message look-up table. If there is a match between the fields of the error log request and selected entries of a record in the look-up table, a user message request is generated which facilitates the display of a pre-existing user friendly message as modified with data included in the generated user message request.

BRIEF DESCRIPTION OF THE DRAWING

FIGS. 3 through 5 are block diagrams of a look-up table which facilitates the display of messages based on error log requests.

FIG. 6 is a block diagram of a message function utility embodying certain principles of the invention.

BEST MODE FOR CARRYING OUT THE INVENTION

Figure 1:
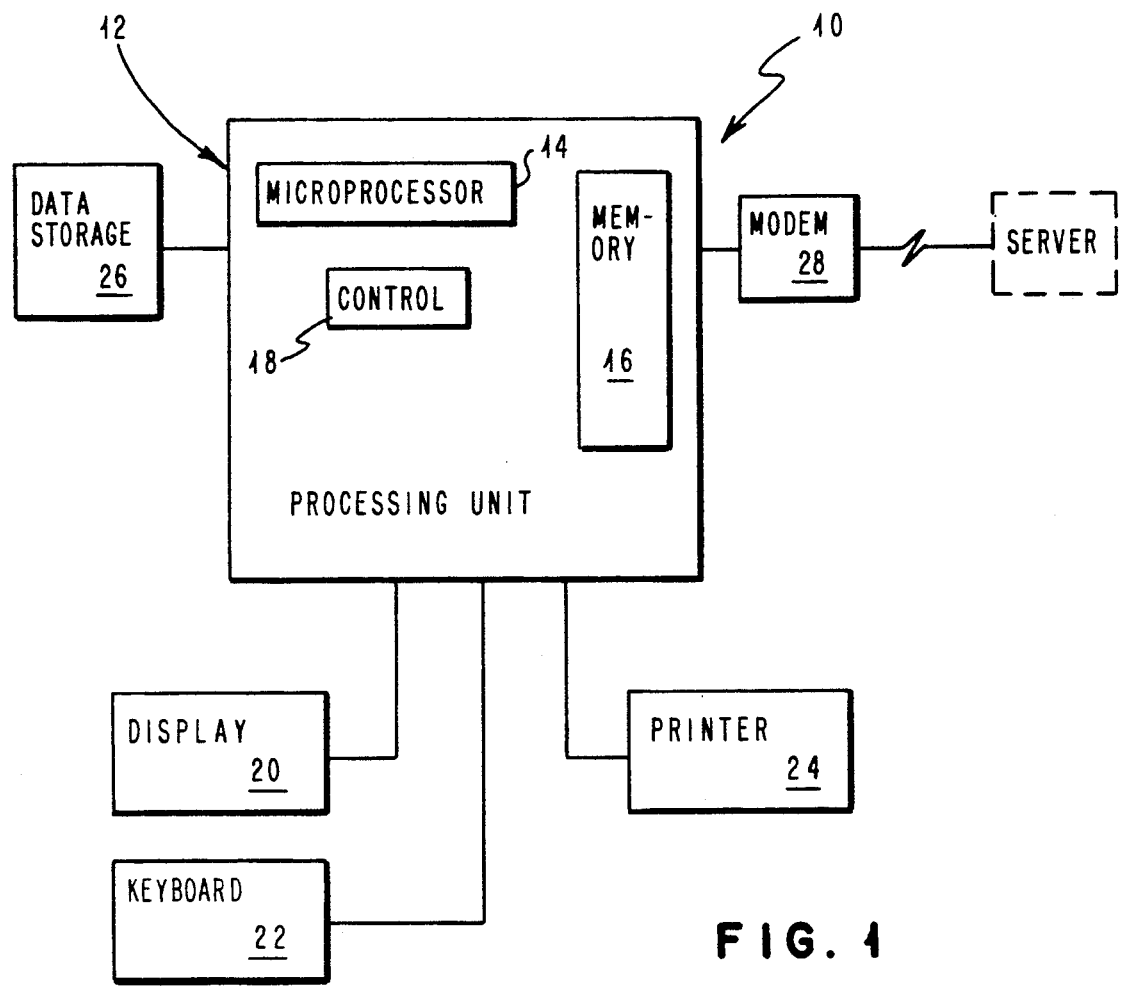
FIG. 1 is a block diagram of a computer system on which the method of the present invention may be employed.

Referring to FIG. 1, there is shown a computer system 10 on which the present invention may be employed. System 10 includes a central processing unit 12 having a microprocessor- 14, a memory system 16 and a control system 18 which functions to control input/output operations in addition to the interaction between the microprocessor and the memory system. System 10 also includes a group of conventional peripheral units including a display device 20, a keyboard 22, a printer 24, a data storage unit 26 and a modem 28. Since the details of the above described functional systems form no part of the present invention and can be found in the prior art, only a brief functional description of each of the systems will be set forth.

The central processing unit 12 corresponds to the "system unit" of a personal computer system such as the IBM XT Model 286 or the IBM AT or the IBM Personal Systems/2 computer systems. The central processing unit 12 is provided with a multitasking operating system program such as the IBM Operating System/2 which is normally employed to run the systems. The operating system program is stored in memory system 16 along with one or more application programs that the user has selected to run. Depending on the capacity of the memory system 16 and the size of the application programs, portions of these programs, as needed, may be transferred to the memory system 16 from the data storage unit 26 which may include, for example, a hard disk drive and a diskette drive. The basic function of the data storage unit 26 is to store programs and data which are employed by the system 10 and which may readily be transferred to the memory system 16 when needed. The function of the diskette drive is to provide a removable storage function for entering programs and data into the system, and a vehicle for storing data in a form that is readily transportable for use on other computer systems.

Display device 20 and keyboard 22 together provide for an interactive operation of the computer system 10 wherein the interpretation that the computer system gives to a specific keystroke by the user depends, in substantially all situations, on what is being displayed to the user at that point in time.

In certain situations, the user, by entering commands into the computer system 10, causes the system to perform a certain function. In other situations, the computer system 10 requests the entry of certain data, generally by displaying a prompt type of menu/message screen. The depth of the interaction between the user and the computer system 10 varies by the type of operating system and the application program, but is a necessary characteristic of the computer systems on which the method of the present invention may be employed.

As noted above, computer system 10 includes the printer 24 which functions to provide a hard copy output of data developed or stored in the computer system.

The modem 28 functions to transfer data from the computer system 10 to a remote host system or server system through one or more communication links which may be a commercial type link or a dedicated communications link.

System 10 also includes a communication software system stored in memory 16 thereof. The communication software system includes a message function program as a integral part thereof which enables the system to display user friendly messages based upon information which is passed in an error log request. The communication software system also includes a plurality of components which perform various communication services and functions within system 10. During the execution of one of the various communication services or functions, a problem may occur which causes an associated error to be logged to the error log for later analysis. Typically, the error information is in a language which is not readily understood by the average user of system 10. Moreover, the component performing the service or function is only concerned with logging the error information. Thus, the user in prior systems may not know that an error has been logged which may prevent a function from being executed or a service performed. This becomes more of a problem in a multitasking environment. In this environment, the user may initiate one task and then change to a different screen to initiate a different task. While the user is operating on the different screen, the first task may encounter problems which prevents the task from executing. For purposes of illustration, the use may initiate the transfer of a large file and then switch to a personal editor function on system 10 while the file is being transferred. If a problem occurs which prevents the file from transferring, the user may never know of the error unless the progress of the transfer is frequently monitored. As noted above, even if the user is aware of an error, the information stored in the error log may be very cryptic and not easily understood. The present invention solves the problem by using a look-up table which is a part of an error log request handler. When there is a request to log an error, the error log request handler upon receiving the request compares various parts of the error information to information stored in the look-up table. If there is a match of the various parts of the error and the elements in the look-up table, the error log request handler generates a user message request and sends the request to a message log request handler. The error log request handler also forwards data to be inserted into a message to be generated and displayed to the user.

Figure 2:
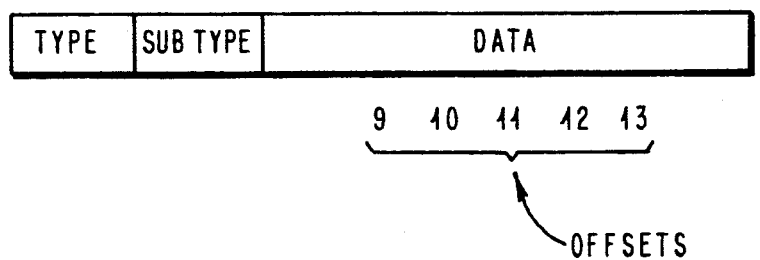
FIG. 2 is a block diagram of a control block used for error log requests within the computer system.

Referring to FIG. 2, there is shown a block diagram of a control block which is generated by the component requesting the logging of an error. The control includes type, sub type and data sections. The type and sub type sections identifies the type of error which was generated. The data section contains at least the identification of the component of the function which submitted the error request and the cause of the error. The data sections are subdivided into groups or offsets. These groups or offsets will vary depending on the type of error. The offsets are used by the error log request handler in comparing the various sections of the control block to entries in the look-up table.

Referring to FIG. 3, there is shown a block diagram of the look-up table. The look-up table may include a type, sub type, search 1, search 2, search 3, message number, data 1, data 2 and data 3 field entries. The search 1, search 2 and search 3 provide for finer granularity of match criteria. Data 1, data 2 and data 3 provide the ability to extract data from the error data and insert it into the user message to be displayed. The contents of the message number field entry, which will be transmitted to the message log request handler if a match is found, also includes an indication whether the message to be generated is to be logged in the message log and displayed, to be displayed only or to be logged only. Each of the search field entries, as shown in FIG. 4, may include an offset entry, a length entry and a data entry, of the data to be matched. Each of the data field entries, as shown in FIG. 5, may include an offset entry, a length entry and a type entry. The type entry of each of the data fields is an indication of whether the data is in hexadecimal or ascii form.

Referring to FIG. 6, there is shown a block diagram of the message/error log handling facility 40. Error log requests and message log/display requests, which are generated by the components of the communication software system, are placed into a message/error log queue 42. A router 44 removes each of the error log requests and message log/display requests and routes the request to the error log request handler 46 or the message log request handler 48. The error log request handler 46 then assembles an error record from the information contained in the control block and stores the error record into the error log file. After the error record has been assembled and logged, the error log request handler 46 performs a comparison of the record with entries in the message look-up table 50 to determine if a message should be generated as a result of the error log request. The search consists of comparing the error log type and sub type of the control block with equivalent entries in the look-up table. If search 1, search 2, or search 3 criteria were specified in the message look-up table, they are compared against the data in the error log request. If a match is found, a message request is generated using data from the control block if data 1, data 2, or data 3 were specified in the message look-up table. The message request generated by the error log request handler 46 is passed to the message log request handler 48. A message number entry along with any error data to be inserted into the message is transmitted to the message handler 48 as a part of the generated message request. The operating system includes a message file which includes a plurality of pre-existing messages with data fields included therein. Upon receiving the message request from the error handler 46, the message handler 48 extracts the message number entry and determines whether the message to be generated is to be logged to the message log and displayed, displayed only or logged only. If the message is to be displayed, the message handler 48 retrieves the message identified by the message number from the operating system message file. The error handler 46 also passes data fields which are to be inserted in the message to be displayed to the user.

The data fields are inserted in the message and the complete message is then displayed to the user. The message number entry also determines if the message is to be displayed and/or logged irrespective of the screen group being displayed to the user. As noted above, the message may also be logged to the message log for later analysis.

Set out below is an illustration of the error log request handler message look-up function program for displaying messages based upon error log requests. The message function program is in program design language from which source code and machine code are derivable.

```
MESSAGE LOOK-UP FUNCTION PROG
    POINT TO START OF MESSAGE LOOK-UP TABLE
        DO UNTIL END OF TABLE OR MATCH FOUND
            IF CONTROL BLOCK ERROR TYPE MATCHES TABLE TYPE
            THEN
                IF TABLE HAS MATCH CRITERIA TO MEET THEN
                    COMPARE CRITERIA TO CONTROL BLOCK DATA
                    FIELD
                    IF CRITERIA MET THEN
                        INDICATE MATCH FOUND
                        EXDO (EXIT TABLE SEARCH)
                    ENDIF
                ELSE (NO MATCH CRITERIA TO MEET)
                    INDICATE MATCH FOUND
                    EXDO (EXIT TABLE SEARCH)
                ENDIF
            ENDIF
        ENDIF
        POINT TO NEXT TABLE ELEMENT
    ENDDO
    IF TABLE MATCH FOUND THEN
        BUILD REQUEST BLOCK FOR MESSAGE REQUEST HANDLER
            USING DATA FROM MESSAGE LOOKUP TABLE ENTRY
        CALL MESSAGE LOG REQUEST HANDLER (TRANSMIT
            REQUEST BLOCK)
    ENDIF
END MESSAGE FUNCTION PROG
```

Figure 7:
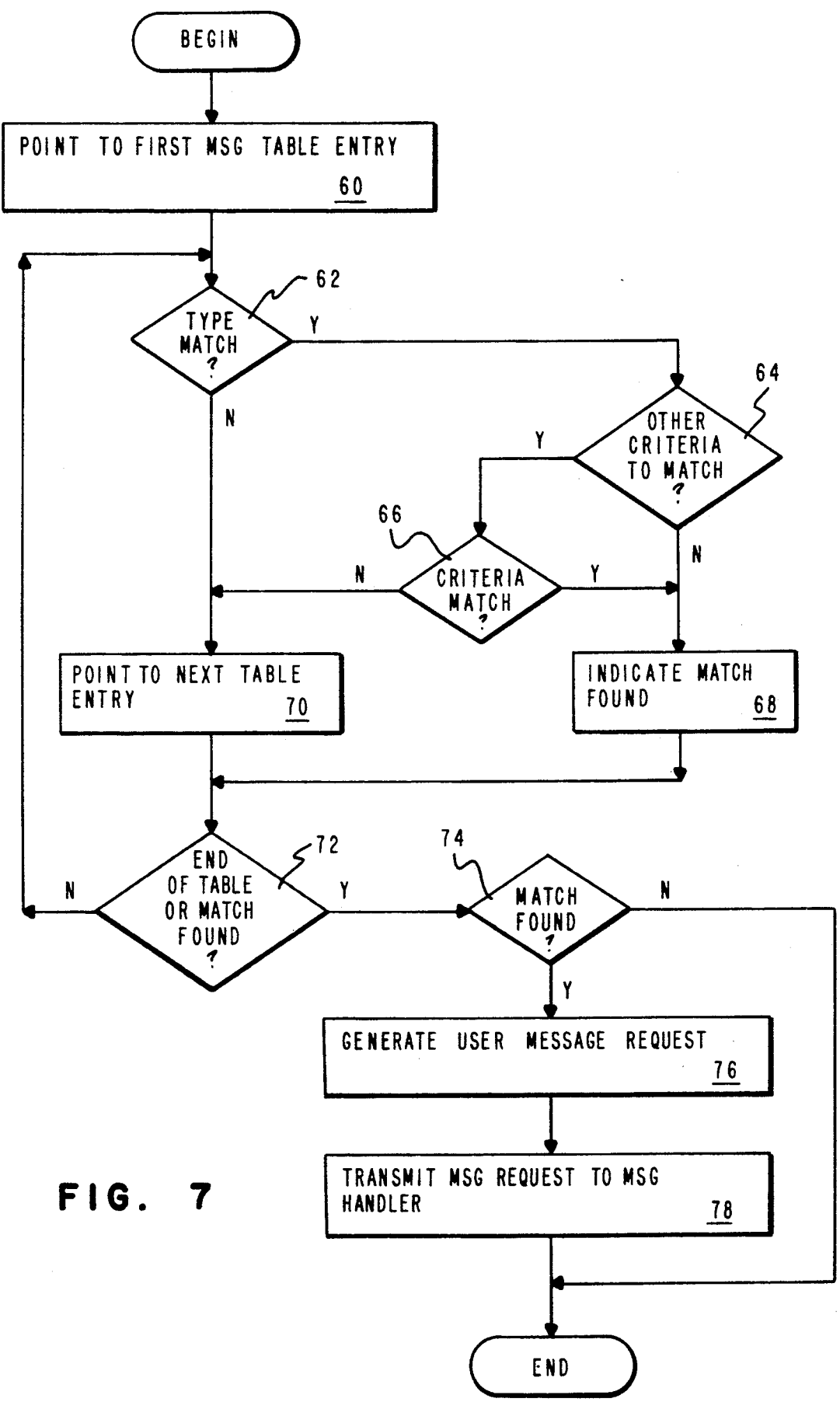
FIG. 7 is a flow diagram illustrating the detailed steps of the method of the present invention.

Referring to FIG. 7, there is shown a flow diagram for the error log request handler message look-up function program. After the router 44 has transmitted a error log request to the error handler 46, a pointer in the message look-up table is initialized to the first table entry therein in step 60. In step 62, a determination is made whether the error log type field in the control block matches the type entry in the message look-up table. If the table entry and the error type field do not match, the pointer is moved to the next table entry in step 70. However, if there is a match in step 62, a determination is made in step 64 whether there are other criteria to be matched. If there are other criteria, such as the search fields or a sub type field, they are compared to equivalent entries in the look-up table. Control is returned to step 70 if the search fields do not match. Otherwise, in step 68, an indication is made that a match was found between the search fields and control is then transferred to step 72. Step 72 determines whether the end of the message look-up table has been attained or if a match has been found. If there are other records in the message look-up table to be searched and a match has not been found, control is transferred to step 62 in order to compare the new entry identified in step 70 with the control block fields. Step 74 determines whether a match was found. If the match was not found and there are no other entries in the look-up table, the search is terminated without displaying a message. If a match was found, a user message request is generated in step 76 by the error handler 46 (FIG. 6). The user message request is then transmitted to the message handler 48 (FIG. 6) in step 78. The message handler then retrieves the message specified in the user message request, enters the data, if any, received from the error handler and facilitates the display and/or logging of the message to the user.

While the invention has been particularly shown and described with reference to a preferred embodiment, it will be understood by those skilled in the art that various changes in form and detail may be made without departing from the spirit and scope of the invention.

We claim:

1. In a multitasking computer system concurrently operating first and second tasks, a method of dynamically displaying on a display screen messages based on first task error log requests, the requests having a plurality of data fields but no associated screen, while operating the screen in conjunction with the second task, said method comprises the steps of:

comparing equivalent fields of a first task error log request with entries in a message look-up table;

contemporaneously generating, in response to a match between said equivalent fields of said error log requests and said entries in said message look-up table, a user message request; and contemporaneously displaying a message relating to the first task to a user of said system operating the display screen in conjunction with the second task using data from the first task as set forth in said error log request in response to the generated user message request.

2. The method as recited in claim 1 wherein said computer system includes an operating system message file, an error request handler and a message request handler and further includes the step of transmitting said user message request from said error request handler to said message handler.

3. The method as recited in claim 2 further includes the step of retrieving a pre-existing message by said message handler from an operating system message file in response to said message request.

4. The method as recited in claim 3 further includes the step of inserting data transmitted to said message request handler by said error request handler into said pre-existing message for display on said computer system.

5. The method as recited in claim 4 wherein said fields of said error log request includes a type entry, a sub type entry and a data field.

6. The method as recited in claim 5 wherein said look-up table includes a plurality of records each having a plurality of entries.

7. The method as recited in claim 6 wherein the step of comparing includes the step of comparing each of said fields each of a plurality of entries of each record until a match if found or until all records of said look-up table have been searched.

8. The method as recited in claim 1 further includes the steps of:

generating an error record in response to said error log request; and storing said generated error record in an error record.

9. The method as recited in claim 8 further includes the step of storing said displayed message into a message log.

* * * * *